United States Patent
Patel et al.

(10) Patent No.: US 8,755,283 B2
(45) Date of Patent: Jun. 17, 2014

(54) SYNCHRONIZING STATE AMONG LOAD BALANCER COMPONENTS

(75) Inventors: Parveen Patel, Redmond, WA (US); Volodymyr Ivanov, Dublin (IE); Marios Zikos, Alexandroupolis (GR); Vladimir Petter, Bellevue, WA (US); Vyacheslav Kuznetsov, Sammamish, WA (US); David Allen Dion, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 276 days.

(21) Appl. No.: 12/972,340

(22) Filed: Dec. 17, 2010

(65) Prior Publication Data

US 2012/0155266 A1   Jun. 21, 2012

(51) Int. Cl.
*H04L 12/407* (2006.01)

(52) U.S. Cl.
USPC .......................... 370/236; 370/401; 709/235

(58) Field of Classification Search
USPC ........ 718/105, FOR. 164; 370/229, 235, 236, 370/401, 230; 455/453; 709/235
See application file for complete search history.

(56) References Cited

U.S. PATENT DOCUMENTS

| | | | |
|---|---|---|---|
| 5,371,852 A * | 12/1994 | Attanasio et al. | ............. 709/245 |
| 6,070,191 A | 5/2000 | Narendran | |
| 6,128,279 A | 10/2000 | O'Neil | |
| 6,351,775 B1 | 2/2002 | Yu | |
| 7,280,557 B1 | 10/2007 | Biswas et al. | |
| 7,512,702 B1 | 3/2009 | Srivastava et al. | |
| 7,567,504 B2 | 7/2009 | Darling et al. | |
| 7,590,736 B2 * | 9/2009 | Hydrie et al. | ................. 709/226 |
| 7,613,822 B2 | 11/2009 | Joy | |
| 7,685,109 B1 | 3/2010 | Ransil | |
| 8,112,545 B1 | 2/2012 | Ong | |
| 2002/0040402 A1 * | 4/2002 | Levy-Abegnoli et al. | .... 709/229 |
| 2003/0005080 A1 * | 1/2003 | Watkins et al. | ............... 709/218 |
| 2003/0202536 A1 | 10/2003 | Foster et al. | |

(Continued)

FOREIGN PATENT DOCUMENTS

JP     2002288038 A    10/2002

OTHER PUBLICATIONS

Nehra, Neeraj, et al., "A Framework for Distributed Dynamic Load Balancing in Heterogeneous Cluster", Journal of Computer Science 3 (1): 2007 Science Publications, pp. 14-24.

(Continued)

*Primary Examiner* — Paul H Masur
*Assistant Examiner* — Michael Phillips
(74) *Attorney, Agent, or Firm* — Ben Tabor; David Andrews; Micky Minhas

(57) ABSTRACT

The present invention extends to methods, systems, and computer program products for synchronizing state among load balancer components. Embodiments of the invention include load balancers using a consistent hashing algorithm to decide how new connections should be load balanced. Use of consistent hashing algorithm permits load balancers to work in a stateless manner in steady state. Load balancers start keeping flow state information (destination address for a given flow) about incoming packets when it is needed, i.e. such as, for example, when a change in destination host configuration is detected. State information is shared across load balancers in a deterministic way, which allows knowing which load balancer is authoritative (e.g., is the owner) for a given flow. Each load balancer can reach the authoritative load balancer to learn about a flow that cannot be determined locally.

18 Claims, 9 Drawing Sheets

(56) References Cited

U.S. PATENT DOCUMENTS

| | | | |
|---|---|---|---|
| 2004/0109447 A1 | 6/2004 | Douglass et al. | |
| 2004/0117794 A1* | 6/2004 | Kundu | 718/102 |
| 2004/0162914 A1 | 8/2004 | St. Pierre et al. | |
| 2005/0055435 A1 | 3/2005 | Gbadegesin et al. | |
| 2005/0132030 A1 | 6/2005 | Hopen et al. | |
| 2005/0149531 A1 | 7/2005 | Srivastava | |
| 2005/0188055 A1 | 8/2005 | Saletore | |
| 2005/0198238 A1 | 9/2005 | Sim et al. | |
| 2005/0249199 A1 | 11/2005 | Albert et al. | |
| 2005/0261985 A1* | 11/2005 | Miller et al. | 705/26 |
| 2006/0294584 A1 | 12/2006 | Sundaram | |
| 2007/0055789 A1* | 3/2007 | Claise et al. | 709/234 |
| 2007/0124476 A1* | 5/2007 | Oesterreicher et al. | 709/226 |
| 2007/0165622 A1 | 7/2007 | O'Rourke et al. | |
| 2008/0104273 A1 | 5/2008 | Bruck et al. | |
| 2008/0183854 A1 | 7/2008 | Hopen et al. | |
| 2008/0259917 A1 | 10/2008 | Hua | |
| 2010/0036903 A1 | 2/2010 | Ahmad | |
| 2010/0036954 A1 | 2/2010 | Sakata et al. | |
| 2010/0057898 A1 | 3/2010 | Imai | |
| 2010/0095008 A1 | 4/2010 | Joshi | |
| 2010/0218254 A1 | 8/2010 | Gray et al. | |
| 2010/0268764 A1 | 10/2010 | Wee et al. | |
| 2010/0302940 A1 | 12/2010 | Patel et al. | |
| 2011/0225231 A1 | 9/2011 | Bansal et al. | |
| 2011/0235508 A1* | 9/2011 | Goel et al. | 370/230 |
| 2012/0099601 A1 | 4/2012 | Haddad et al. | |
| 2012/0207174 A1 | 8/2012 | Shieh | |
| 2012/0303809 A1 | 11/2012 | Patel et al. | |
| 2013/0148505 A1 | 6/2013 | Koponen et al. | |
| 2013/0159487 A1 | 6/2013 | Patel et al. | |
| 2014/0019602 A1 | 1/2014 | Murthy et al. | |
| 2014/0029430 A1* | 1/2014 | Samuels et al. | 370/235 |

OTHER PUBLICATIONS

Bunt, Richard B., et al., "Achieving Load Balance and Effective Caching in Clustered Web Servers", Proceedings of the Fourth International Web Caching Workshop, San Diego, CA, Apr. 1999, pp. 159-169.

K2 Colocation, Network Load Balancing Appliance, Intelligent Routing Network Appliance, "Flow Control Platform (FCP) Solutions", Jan. 4, 2007, 2 pages.

Greenberg, et al., "Towards a Next Generation Data Center Architecture: Scalability and Commoditization", In Proceedings of the ACM Workshop on Programmable Routers for Extensible Services of Tomorrow, Aug. 22, 2008, pp. 57-62.

Alur, Sanjeev J., "Enterprise Integration and Distributed Computing: A Ubiquitous Phenomenon", Published: Dec. 27, 2008. Available at: http://msdn.microsoft.com/en-us/library/cc949110.aspx.

Joseph, et al., "A Policy-Aware Switching Layer for Data Centers", In Proceedings of the ACM SIGCOMM Conference on Data Communication, Aug. 17, 2008, pp. 51-82.

Al-Fares, et al., "Hedera: Dynamic Flow Scheduling for Data Center Networks", In Proceedings of the 7th USENIX Conference on Networked Systems Design and Implementation, Apr. 28, 2010, pp. 281-295.

Stage, et al., "Network-aware Migration Control and Scheduling of Differentiated Virtual Machine Workloads", In Workshop on Software Engineering Challenges in Cloud Computing, May 23, 2009, pp. 9-14.

"Load Balancing: Optimum Performance, Scalability and Resiliency", Available at least as early as Apr. 20, 2012, available at: http://www.contegix.com/solutions/managed-hosting/managed-services/load-balancing/.

White Paper, Equalizer, "Purpose-Built Load Balancing the Advantages of Coyote Point Equalizer over Software-based Solutions", Copyright 2004 Coyote Point Systems, Inc. 9 pages. (The month of Publication is irrelevant since the year of Publication is clearly prior to the filing of the Application).

Microsoft TechNet, "MS Windows NT Load Balancing Service Whitepaper", Based on current information and belief, this reference was available at least as early as Jul. 27, 2010, 9 pages.

HAProxy, "The Reliable, High Performance TCP/HTTP Load Balancer", Jun. 16, 2010, 10 pages.

Top Web Hosting, "Load Balancing", Copyright 2002-2010, Based on current information and belief, this reference was available at least as early as Jul. 27, 2010, 6 pages.

Linux.com, WALCOTT, Costa, "Taking a load off: Load balancing with balance", Aug. 17, 2005, 7 pages.

InfoBPN Solutions on Business Process Networking Business and Process Automation, "Application Load Balancing Solution", Based on current information and belief, this reference was available at least as early as Jul. 27, 2010.

U.S. Appl. No. 13/547,805, filed Jan. 3, 2014, Office Action.
U.S. Appl. No. 13/115,444, filed Apr. 15, 2013, Office Action.
U.S. Appl. No. 13/115,444, filed Sep. 13, 2013, Office Action.
U.S. Appl. No. 13/115,444, filed Jan. 30, 2014, Office Action.
Notice of Allowance dated Apr. 14, 2014 cited in U.S. Appl. No. 13/547,805.

* cited by examiner (Steady State)

(Removal)

(Replacement)

(Addition During Transition Period)

(MUX Failure)

SYNCHRONIZING STATE AMONG LOAD BALANCER COMPONENTS

CROSS-REFERENCE TO RELATED APPLICATIONS

Not Applicable.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing environments.

In distributed computing systems, distributed load balancers are often used to share processing load across a number of computer systems. For example, a plurality of load balancers can be used to receive external communication directed to a plurality of processing endpoints. Each load balancer has some mechanism to insure that all external communication from the same origin is directed to the same processing endpoint.

For load balancers to make accurate decisions on where to direct external communication (e.g., to which processing endpoint), load balancers share state with one another. For example, a decision made at one load balancer for communication for specified origin can be synchronized across other load balancers. Based on the synchronized state, any load balancer can then make an accurate decision with respect to sending communication from the specified origin to the same processing endpoint.

Unfortunately, to maintain synchronized state among a plurality of load balancers, significant quantities of data often need to be exchanged between the plurality of load balancers. As a result, synchronizing state among load balancers becomes a bottleneck and limits the scalability of load balancers.

BRIEF SUMMARY

The present invention extends to methods, systems, and computer program products for synchronizing state among load balancer components. In some embodiments, a load balancer receives a packet from a router. The packet contains source electronic address information identifying a source on the wide area network and destination electronic address information including a virtual electronic address. The load balancer uses an algorithm to generate a data flow identifier for the existing data flow from the source electronic address information and the destination electronic address information. The load balancer determines that the packet is for an existing data flow.

The load balancer determines that the load balancer lacks sufficient information to identify a destination host, from among a plurality of destination hosts, that corresponds to the existing data flow. This includes the load balancer not having cached state that maps the existing data flow to one of the destination hosts in the plurality of destination hosts.

In response to the determination, the load balancer identifies an owner load balancer that is designated as the owner of the existing data flow. Also in response to the determination, the load balancer sends a request for data flow state information to the owner load balancer. The load balancer receives state information from the owner load balancer. The state information identifies the destination host that corresponds to the existing data flow. The load balancer caches the received state information.

On subsequent packets in this data flow, the load balancer sends a message back to the owner load balancer to indicate the continuation of the data flow. This continuation message needs only be sent once per idle timeout interval. The idle timeout interval determines how long a data flow retains its mapping to the same destination host even in absence of any packets.

The load balancer determines that the received packet is for an existing data flow. The load balancer determines that the load balancer is not the owner of the existing data flow. The load balancer determines that the load balancer has cached state for the existing data flow. The cached state maps the existing data flow to one of the destination hosts in the plurality of destination hosts. The load balancer sends the received packet to the destination host mapped to the existing data flow. The load balancer determines whether it needs to send data flow continuation message to the owner load balancer. The load balancer sends the cached state to the owner load balancer.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
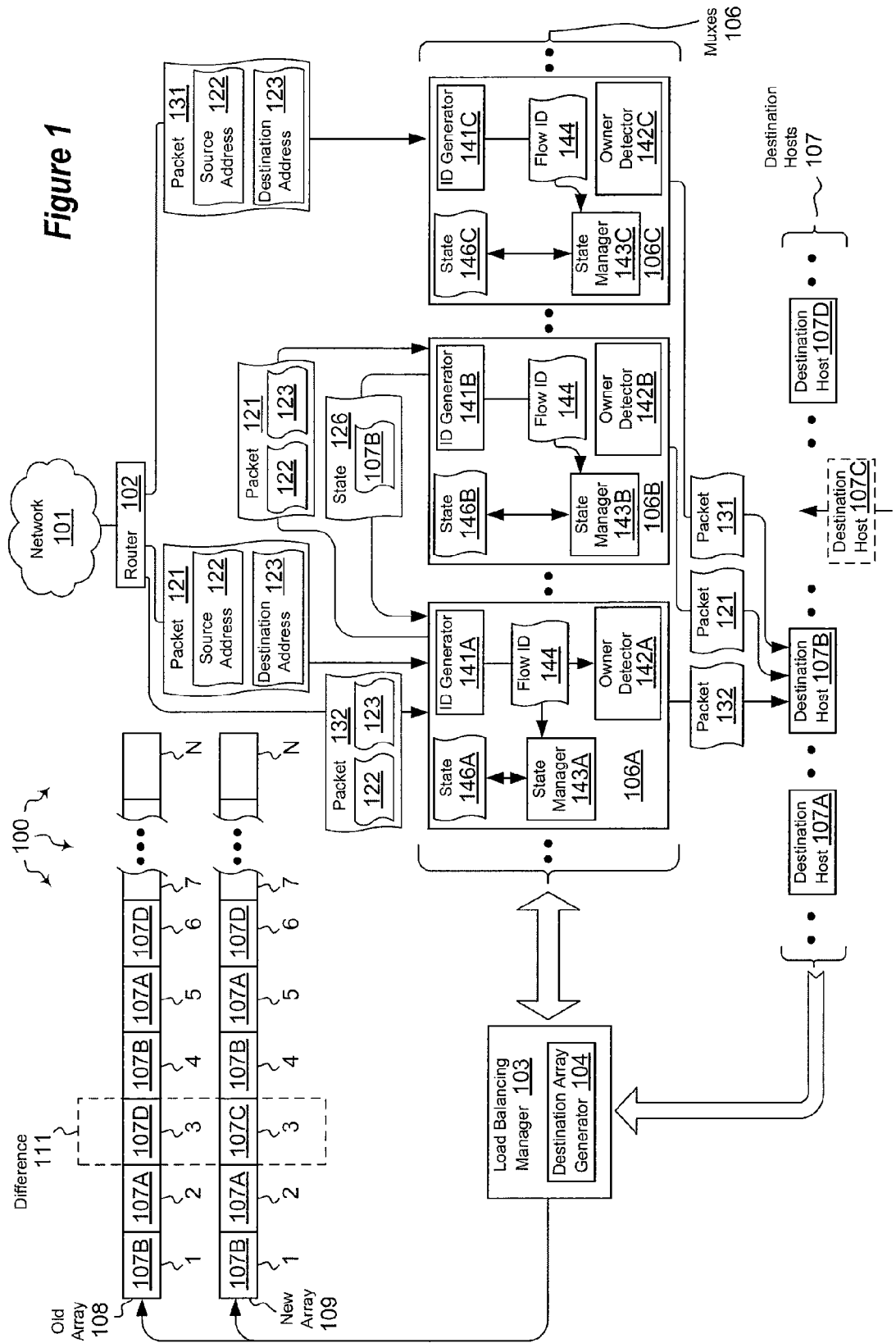
FIG. 1 illustrates an example computer architecture that facilitates synchronizing state among load balancer components.

The present invention extends to methods, systems, and computer program products for synchronizing state among load balancer components. In some embodiments, a load balancer receives a packet from a router. The packet contains source electronic address information identifying a source on the wide area network and destination electronic address information including a virtual electronic address. The load balancer uses an algorithm to generate a data flow identifier for the existing data flow from the source electronic address information and the destination electronic address information. The load balancer determines that the packet is for an existing data flow.

The load balancer determines that the load balancer lacks sufficient information to identify a destination host, from among a plurality of destination hosts, that corresponds to the existing data flow. This includes the load balancer not having cached state that maps the existing data flow to one of the destination hosts in the plurality of destination hosts.

In response to the determination, the load balancer identifies an owner load balancer that is designated as the owner of the existing data flow. Also in response to the determination, the load balancer sends a request for data flow state information to the owner load balancer. The load balancer receives state information from the owner load balancer. The state information identifies the destination host that corresponds to the existing data flow. The load balancer caches the received state information.

On subsequent packets in this data flow, the load balancer sends a message back to the owner load balancer to indicate the continuation of the data flow. This continuation message needs only be sent once per idle timeout interval. The idle timeout interval determines how long a data flow retains its mapping to the same destination host even in absence of any packets.

The load balancer determines that the received packet is for an existing data flow. The load balancer determines that the load balancer is not the owner of the existing data flow. The load balancer determines that the load balancer has cached state for the existing data flow. The cached state maps the existing data flow to one of the destination hosts in the plurality of destination hosts. The load balancer sends the received packet to the destination host mapped to the existing data flow. The load balancer determines whether it needs to send data flow continuation message to the owner load balancer. The load balancer sends the cached state to the owner load balancer.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM, DVD, or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates an example computer architecture 100 that facilitates synchronizing state among load balancer components. Referring to FIG. 1, computer architecture 100 includes router 102, load balancing manager 103, multiplexers ("muxes") 106, and destination hosts 107. Each of the depicted computer systems is connected to one another over (or is part of) a network, such as, for example, a Local Area Network ("LAN") and/or a Wide Area Network ("WAN"). Router 102 is further connected to network 101. Network 101 can be a further WAN, such as, for example, the Internet. Accordingly, each of the depicted components as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the described networks.

Generally, router 102 interfaces between network 101 and other components of computer architecture 101 to appropriately route packets between network 101 and the other components of computer architecture 100. Router 102 can be configured to receive messages from network 101 and forward those messages to appropriate components of computer architecture 100. For example, router 102 can be configured to forward IP traffic for Virtual Internet Protocol Addresses ("VIPs") to IP addresses of the physical interfaces at muxes 106. Router 102 can support Equal Cost Multi-Path ("ECMP") routing to virtually any number (e.g., 4, 8, 16, etc.) of IP addresses. Accordingly, a plurality of muxes 106 can be configured as active muxes. In other embodiments, (e.g., when ECMP is not supported), one mux can be configured as an active mux and zero or more other muxes configured as stand-by muxes.

In further embodiments, a Domain Name Services ("DNS") round robin approach is used. One or more VIPs are assigned to and shared between a plurality of muxes 106. A Domain Name Services ("DNS") name is registered to resolve the one or more VIPs. If a mux 106 fails, the VIPs it owns are failed over to other muxes 106.

In additional embodiments, a VIP is configured on the network interface card for each mux. One of the muxes (e.g., a master node) is set to respond to Address Resolution Protocol ("ARP") requests for the VIP. Thus, router 102 can send any packets for the VIP to the master node. The master node can then perform Layer 2 forwarding based on current state and/or load balancer rules. Use of a "master node" can mitigate flooding and is much cheaper than Layer 3 forwarding.

As depicted, muxes 106 include a plurality of muxes including muxes 106A, 106B, and 106C. Destination hosts 107 include a plurality destination hosts includes destination hosts 107A, 107B, and 107D. Generally, each mux 106 is configured to receive a packet, identify the appropriate destination host for the packet, and forward the packet to the appropriate destination host. In some embodiments, an appropriate destination host 107 for a packet is identified from one or more of: the contents of the packet, cached state at a receiving mux, cached state at other muxes, whether the packet is for an existing data flow or a new data flow, and the configuration of destination hosts 107.

Each mux includes an ID generator, an owner detector, and a state manager. For example, muxes 106A, 106B, and 106C include ID generators 141A, 141B, 141C, owner detectors 142A, 142B, and 142C, and state managers 143A, 143B, and 143C respectively. Each ID generator is configured to generate a data flow ID for a packet based on the contents of the packet. In some embodiments, a 5-tuple of (source IP:port, VIP:port, IP protocol) is used to represent and/or generate a data flow ID. In other embodiments, a subset of this 5-tuple may be used. A new data flow ID can be mapped to a destination host 107 identified, for example, by (Destination Host IP:port). A corresponding state manager can cache state mapping a data flow ID and (Destination Host IP:port). Thus, when further packets having the same flow ID are received, the mux can refer to the cached state to identify the appropriate destination host 107 for each of the further packets.

In some embodiments, different portions of a data flow ID space are "owned" by different muxes. An owner detector at each mux is configured to determine the owner mux for a data flow ID. Then owner detector can receive a data flow ID as input and return the IP address for the owner mux as output. Thus, each mux can send state to and/or request state from an owner mux for each data flow ID. For example, when a mux identifies an appropriate destination host for a data flow ID, the mux can (in addition to also caching) forward the appropriate destination host to the owner mux for the data flow ID. On the other hand, when a mux lacks sufficient information to identify an appropriate destination host for a data flow ID, the mux can query the owner mux to obtain the appropriate destination host.

In some embodiments, when a mux lacks sufficient information to identify the appropriate destination host for a packet corresponding to a data flow ID, the mux sends the packet to the owner mux for the data flow ID. In response to receiving the packet, the owner mux determines the appropriate destination host for the data flow ID. Also, the owner mux sends cached state (either generated at the owner mux or received from further other muxes) mapping the data flow ID to the appropriate destination host to the mux.

In other embodiments, when a mux lacks sufficient information to identify the appropriate destination host for a data flow ID, the mux sends an express request for cached state to the owner mux for the data flow ID. In response to receiving the express request, the owner mux sends cached state (either generated at the owner mux or received from further other muxes) mapping the data flow ID to the appropriate destination host to the mux. The mux then sends the packet to the appropriate destination host.

Generally, load balancing manager 103 is configured to monitor the arrangement of destination hosts 107 for transitions (e.g., when a new destination host is being added). Destination array generator 104 can, from time to time, formulate (e.g., using a hashing function) an array that maps data flow IDs to destination hosts. Load balancing manger 103 can maintain two versions of the array, a current version of the array (e.g., new array 109) and the immediate previous version of the array (e.g., old array 108). The positions within the array can correspond to data flow IDs. For example, array position 1 can correspond to data flow ID 1, etc. Thus, as indicated in arrays 108 and 109 the destination host 107B is the appropriate destination host for data flow ID 1.

Load balancing manager 103 can communicate the two versions of the array to muxes 106. When the arrangement of destination hosts 107 is in a steady state, mappings in the current and immediate previous versions of the array match. As such, in steady state, a mux 106 can refer to the mappings to determine where to send a packet for a specified data flow ID (even when the mux lacks cached state).

On the other hand, when the arrangement of destination hosts 107 is in transition (e.g., when a new destination host 107 is being added), mappings in the current and immediate previous versions of the array differ. For example, when a new destination host 107 is added, the data flow ID space can be spread across more destination hosts 107 to reduce the load on individual destination hosts 107. For example, difference 111 indicates that a portion of the data flow ID space previously corresponding to destination host 107D (e.g., data flow ID 3) now corresponds to destination host 107C. To increase the likelihood of packets for existing data flows continuing to the same destination host, muxes 106 can refer to cached state (either locally or queried from an owner mux) when the arrangement of destination hosts 107 is in transition.

Figure 2:
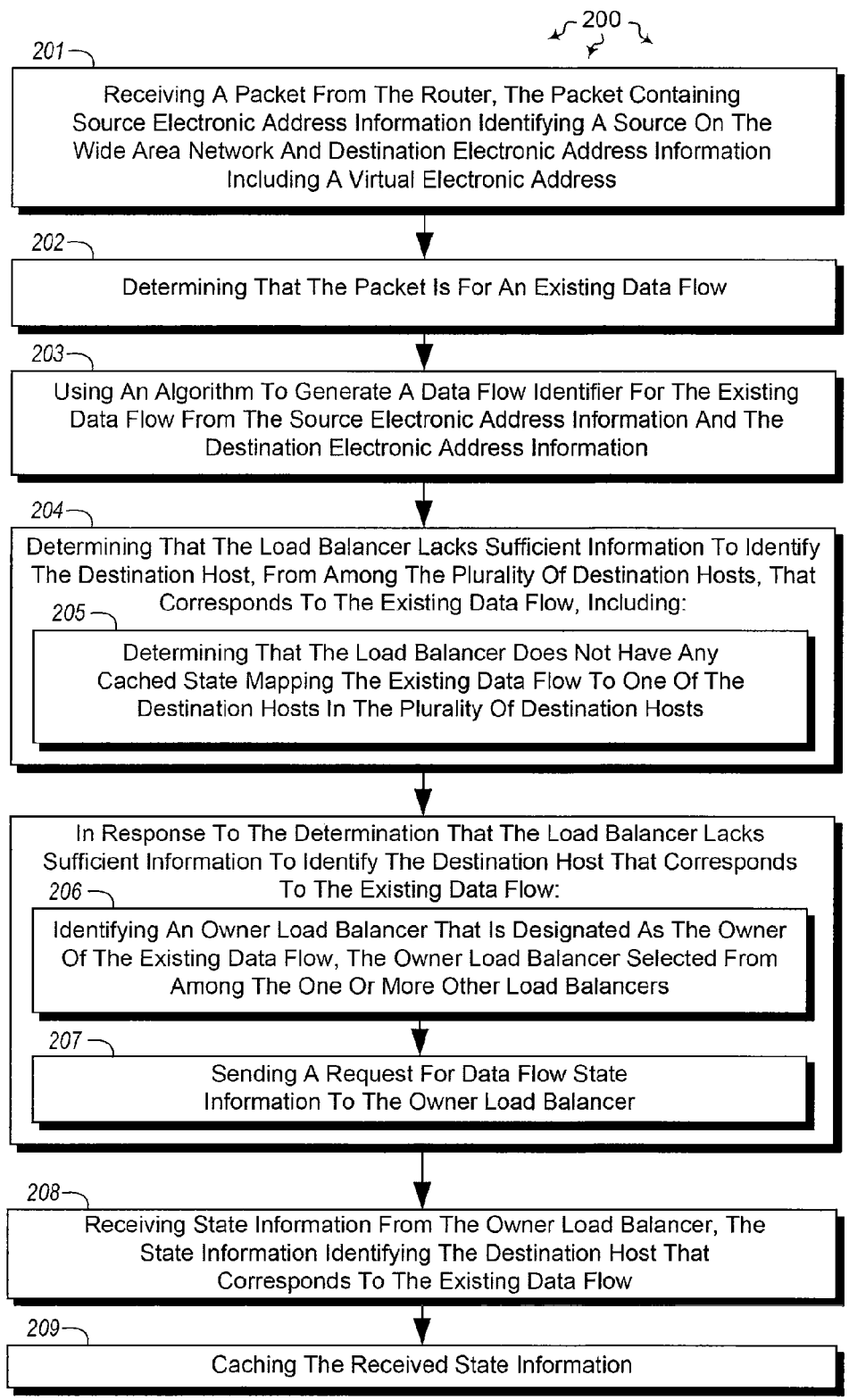
FIG. 2 illustrates a flow chart of an example method for sharing state between load balancers.

FIG. 2 illustrates a flow chart of an example method 200 for sharing state between load balancers. Method 200 will be described with respect to the components and data of computer architecture 100.

Method 200 includes an act of the load balancer receiving a packet from the router, the packet containing source electronic address information identifying a source on the wide area network and destination electronic address information including the virtual electronic address (act 201). For example, mux 106A can receive packet 121 from router 102. Packet 121 contains source (e.g., IP) address 122 identifying a source on network 101. Packet 121 also contains destination address 123. Destination address 123 can be a Virtual IP address used to contact destination hosts 107.

Method 200 includes an act of the load balancer determining that the packet is for an existing data flow (act 202). For example, mux 106 can determine that packet 121 is for an existing data flow. The first packet in a data flow (e.g., a SYN packet for Transmission Control Protocol, TCP, packets) can contain a first packet indicator. Other packets in the data flow (e.g., non-SYN packets for TCP) do not contain the first packet indicator. Thus, when a packet does not contain a first packet indicator, a mux can infer that the packet is for an existing data flow. Mux 106A can determine that packet 121 does not contain a first packet indicator. As such, much 106A infers that packet 121 is for an existing data flow.

Method 200 includes an act of the load balancer using an algorithm to generate a data flow identifier for the existing data flow from the source electronic address information and the destination electronic address information (act 203). For example, ID generator can use a hash function to hash source address 122 and destination address 123 into flow ID 144. Flow ID 144 can represent an index position, for example, of new array 109. For example, Flow ID 144 can represent the $4^{th}$ position in new array 109. In some embodiments, a hash algorithm is used to hash a source IP address and VIP into a data flow identifier.

Method 200 includes an act of load balancer determining that the load balancer lacks sufficient information to identify the destination host, from among the plurality of destination hosts, that corresponds to the existing data flow (act 204). For example, mux 106A can determine that mux 106A lacks sufficient information to identify the appropriate destination host, from among destination hosts 107, that corresponds to flow ID 144.

Act 204 can include an act of the load balancer determining that the load balancer does not have any cached state mapping the existing data flow to one of the destination hosts in the plurality of destination hosts (act 205). For example, state manager 143A can determine that mux 106A does not have any cached state mapping flow ID 144 to one of destination hosts 107. State manager 143A can refer to state 146A (cached state) to check for a destination host mapping for flow ID 144.

Act 204 can include an act of the load balancer detecting that the arrangement of the plurality of destination hosts is in a transition. For example, mux 106A can detect a transition in the arrangement of destination hosts 107. Destination host 107C can be added to destination hosts 107 during the lifetime of one or more existing data flows (e.g., flow ID 144). Destination array generator 104 can detect the change. In response, destination array generator 104 can generate new array 109. Mux 106A can refer to old array 108 and new array 109. As depicted at least by difference 111, mux 106A detects the transition. That is, a portion of the data flow ID space is now allocated to destination host 107C.

Method 200 includes in response to the determination that the load balancer lacks sufficient information to identify the destination host that corresponds to the existing data flow, an act of the load balancer identifying an owner load balancer that is designated as the owner of the existing data flow, the owner load balancer selected from among the one or more other load balancers (act 206). For example, mux 106A can identify mux 106B as the owner of flow ID 144. Owner detector 142A can receive flow ID 144 as input and output the IP address for mux 106B as the owner of flow ID 144.

In some embodiments, mux 106A uses a second hashing algorithm to hash source address 122 and destination address 123 into a second hash value. The second hash value represents an index position in an owner array (e.g., depicted in FIGS. 7A and 7B). The owner array maps data flows to corresponding owner muxes that maintain state for mapped data flows when a transition is detected. Thus, mux 106A can refer to an index position for flow ID 144 in an owner array to identify mux 106B as the owner of flow ID 144.

Load balancing manager 103 can monitor muxes 106 and adjust primary owner arrays and backup owner arrays for data flows as muxes are added and/or removed from muxes 106. Load balancing manager 103 can distribute ownership for data flows to (the extent possible) balance primary and backup ownership across muxes 106.

Method 200 also includes in response to the determination that the load balancer lacks sufficient information to identify the destination host that corresponds to the existing data flow, an act of the load balancer sending a request for data flow state information to the owner load balancer (act 207). For example, mux 106A can send packet 121 to mux 106B. Alternately, mux 106A can retain packet 121 and send an express request for data flow state information for flow ID 144 to mux 106B.

Mux 106B can receive packet 121 from mux 106A. Upon receiving packet 121, ID generator 141B can generate flow ID 144 from source address 122 and destination address 123. Owner detector 142B can then determine that mux 106B is the owner for flow ID 144. State manager 142B can refer to state 146B to access state 126. State 126 can map flow ID 144 to destination host 107B. If no state is found, mux 106B can generate new state 126 using the current destination array. Mux 106B can send packet 121 to destination host 107B. Mux 106B can return state 126 to mux 106A. Mux 106B can also send state 126 to backup owner corresponding to this flow.

Alternately, mux 106B can receive an express request for data flow state information for flow ID 144 from mux 106A. Owner detector 142B can determine that mux 106B is the owner for flow ID 144. State manager 142B can refer to state 146B to access state 126. Mux 106B can return state 126 to mux 106A.

Method 200 includes an act of the load balancer receiving state information from the owner load balancer, the state information identifying the destination host that corresponds to the existing data flow (act 208). For example, mux 106A can receive state 126 from mux 106B. Method 200 includes an act of the load balancer caching the received state information (act 209). For example, mux 106A can cache state 126 in state 146A. When mux 106A receives state 126 in response to an express request, mux 106A can then send packet 121 to destination host 107B.

Further, when subsequent packets for flow ID 144 are received (even if mux 106B sends packet 121 to destination host 107B), mux 106A can identify destination host 107B as the appropriate destination host for the subsequent packets. For example, mux 106A can receive packet 132. Packet 132 contains source address 122 and destination address 123. ID generator 141B can determine that packet 132 corresponds to flow ID 144. State manager 143B can refer to state 146A to identify that destination host 107B is the appropriate destination host for flow ID 144. Mux 106A can then send packet 132 to destination host 107B.

Other muxes can also receive packets for flow ID 144. If these other muxes have cached state for flow ID 144 (either self generated or queried from another mux) they can send packets onto destination host 107B. For example, mux 106C can receive packet 131. Packet 131 contains source address 122 and destination address 123. ID generator 141C can determine that packet 132 corresponds to flow ID 144. State manager 143C can refer to state 146C to identify that destination host 107B is the appropriate destination host for flow ID 144. Mux 106C can then send packet 131 to destination host 107B.

Further, when an arrangement of destination host is in a transition, muxes with state for existing data flows that have a different destination host in the old and new destination array can send the state to an owner mux for the data flows. For example, it may be that the addition of destination host 107C causes a transition in destination hosts 107. Upon detecting the transition mux 106C can have state for one or more existing data flows for which other muxes, such as, for example, mux 106A and/or mux 106B are owners. In response to detecting the transition, mux 106 can send state for existing data flows that have a different destination host in the old and new destination array to the appropriate owner mux. For example, mux 106C can send state for flow ID 144 to mux 106C (not shown). During a transition, appropriate owner muxes can receive state from other muxes. For example, mux 106A can receive state for flow ID 144 from mux 106C (not shown).

Figure 3:
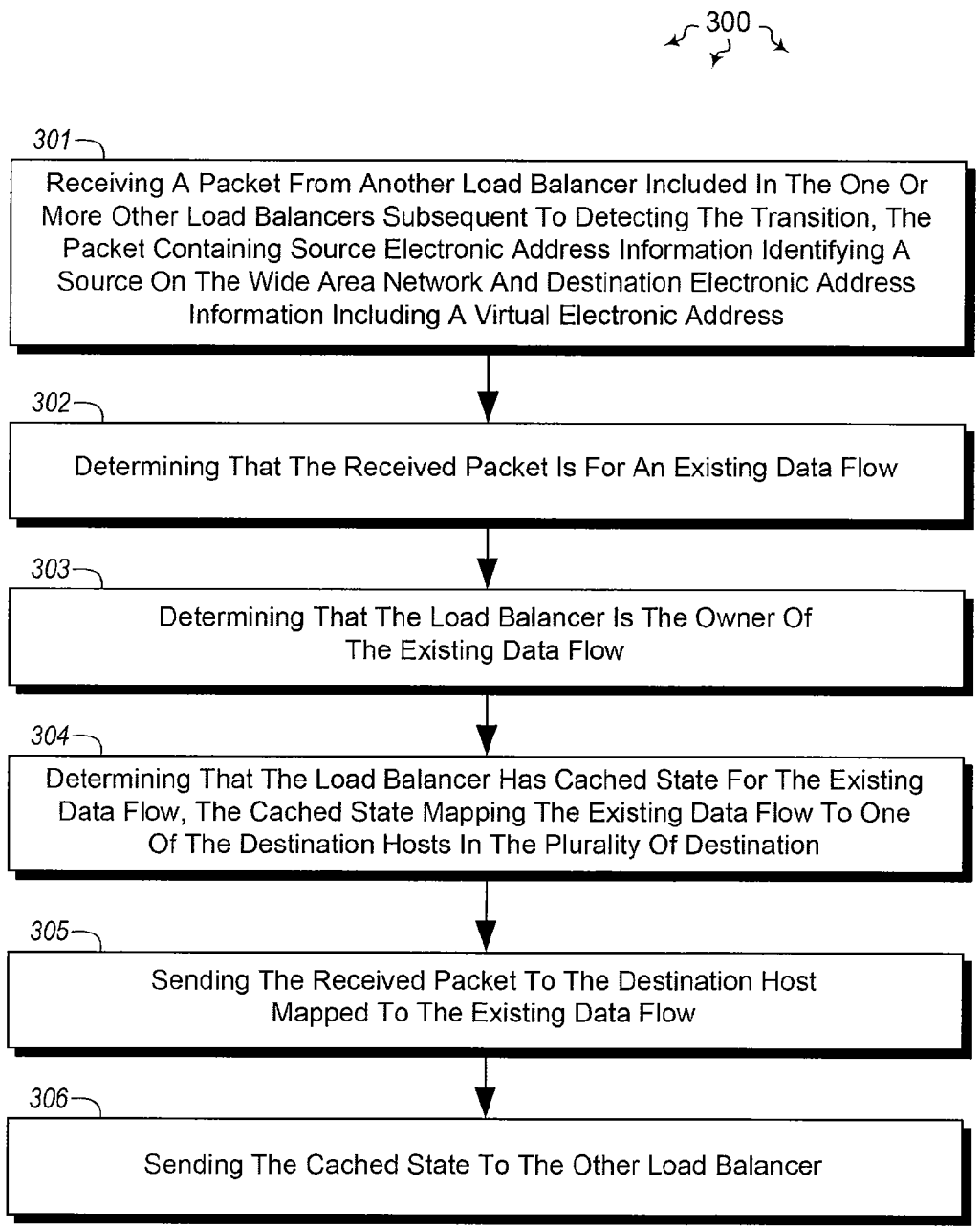
FIG. 3 illustrates a flow chart of an example method for sharing state between load balancers.

FIG. 3 illustrates a flow chart of an example method 300 for sharing state between load balancers. Method 300 will be described with respect to the components and data of computer architecture 100.

Method 300 includes an act of the load balancer receiving a packet from another load balancer included in the one or more other load balancers, the packet containing source electronic address information identifying a source on the wide area network and destination electronic address information including the virtual electronic address (act 301). For example, mux 106B can receive packet 121 from mux 106A. Method 300 includes an act of the load balancer determining that the received packet is for an existing data flow (act 302). For example, id generator 144 can determine that packet 121 corresponds to flow ID144. Method 300 includes an act of the load balancer determining that the load balancer is the owner of the existing data flow (act 302). For example, owner detector 142B can determine that mux 106B is the owner of flow ID 144.

Method 300 includes an act of the load balancer determining that the load balancer has cached state for the existing data flow, the cached state mapping the existing data flow to one of the destination hosts in the plurality of destination hosts (act 304). For example, state manager 142B can refer to state 146B to access state 126. State 126 can indicate that flow ID 144 corresponds to destination host 107B. Alternately, state manager 142B can generate state 126.

Method 300 includes an act of the load balancer sending the received packet to the destination host mapped to the existing data flow (act 305). For example, mux 106B can send packet 121 to destination host 107B. Method 300 includes an act of load balancer sending the cached state to the other load balancer (act 306). For example, mux 106B can return state 126 to mux 106A.

Alternately, mux 106B can receive an express request from mux 106A for state mapping flow ID 144 to an appropriate destination host 107. In response, state manager 142B can refer to state 146B to access state 126. State 126 can indicate that flow ID 144 corresponds to destination host 107B. Mux 106B can return state 126 to mux 106A. Mux 106A can then send packet 121 to destination host 107B based on the mapping in state 126.

Figure 4A:
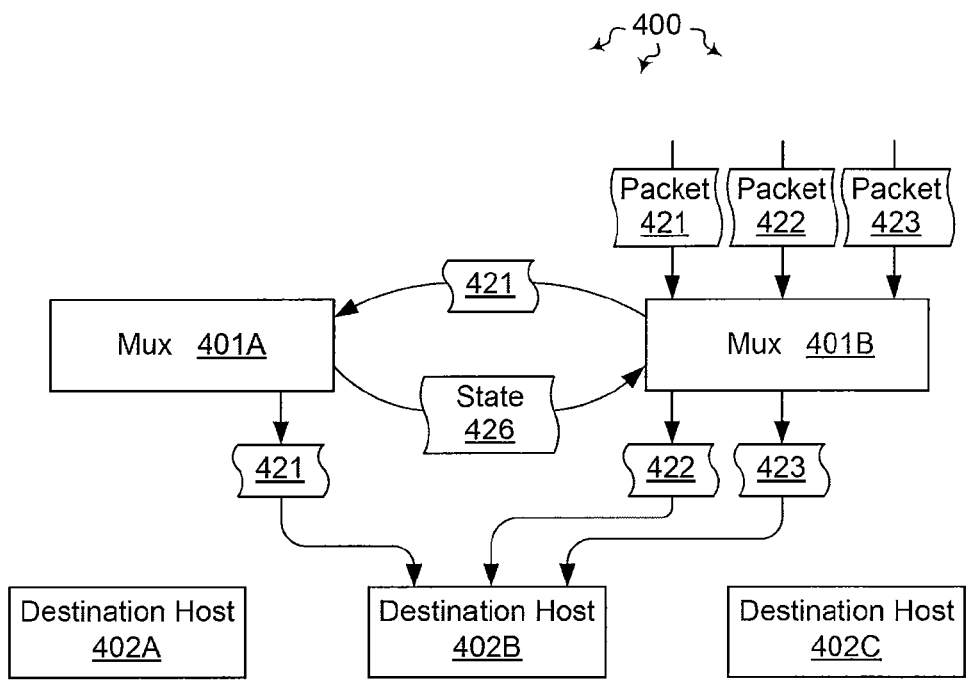
FIGS. 4A and 4B illustrate an example computer architecture for sharing state between muxes.
Figure 4B:
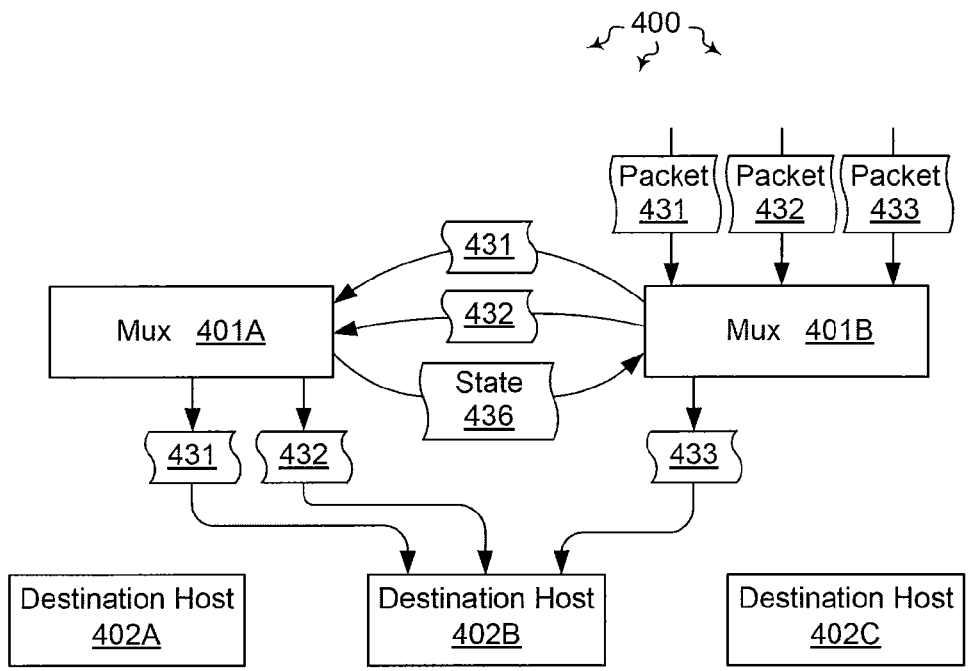

FIGS. 4A and 4B illustrate example computer architecture 400 for sharing state between muxes. As depicted, computer architecture 400 includes muxes 401A and 401B and destination hosts 402A, 402B, and 402C. In FIG. 4A, mux 401B receives packet 421. Mux 401B determines it lacks sufficient information to identify an appropriate destination host. In response, mux 401B sends packet 421 to mux 401A (an owner mux). Mux 401A receives packet 421 from mux 401B. Mux 401A identifies and returns state 426 to mux 401B. State 426 maps a data flow for packet 421 to destination host 402B. Mux 401A also forwards packet 421 to destination host 402B. Subsequently, mux 401B receives packets 422 and 423 for the same data flow as packet 421. Based on state 426, mux 401B sends packets 422 and 423 to destination host 402B.

In FIG. 4B, mux 401A receives packet 431. Mux 401B determines it lacks sufficient information to identify an appropriate destination host. In response, mux 401B sends packet 431 to mux 401A (an owner mux). Mux 401A receives packet 431 from mux 401B. Mux 401A identifies and returns state 436 to mux 401B. State 436 maps a data flow for packet 431 to destination host 402B. Mux 401A sends packet 431 to destination host 402B.

However, prior to receiving state 436, mux 401B receives packet 432 for the same data flow as packet 431. Since mux 401B has not yet received state 436, mux 401B determines it lacks sufficient information to identify an appropriate destination host. In response, mux 401B also sends packet 432 to mux 401A. Mux 401A receives packet 432 from mux 401B. Mux 401A determines that is has already sent state 436 to mux 401B. Mux 401A sends packet 432 to destination host 402B. Subsequently, mux 401B receives packet 433 for the same data flow as packet 431. Based on state 436, mux 401B sends packets 433 to destination host 402B. Accordingly, embodiments of the invention can compensate for delays in the exchange of state between muxes.

Figure 5A:
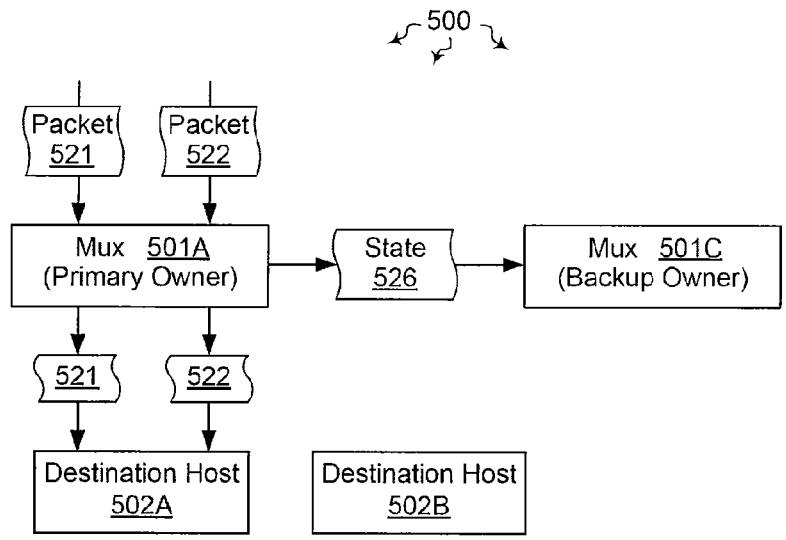
FIGS. 5A and 5B illustrate an example computer architecture for sharing state between muxes.
Figure 5B:
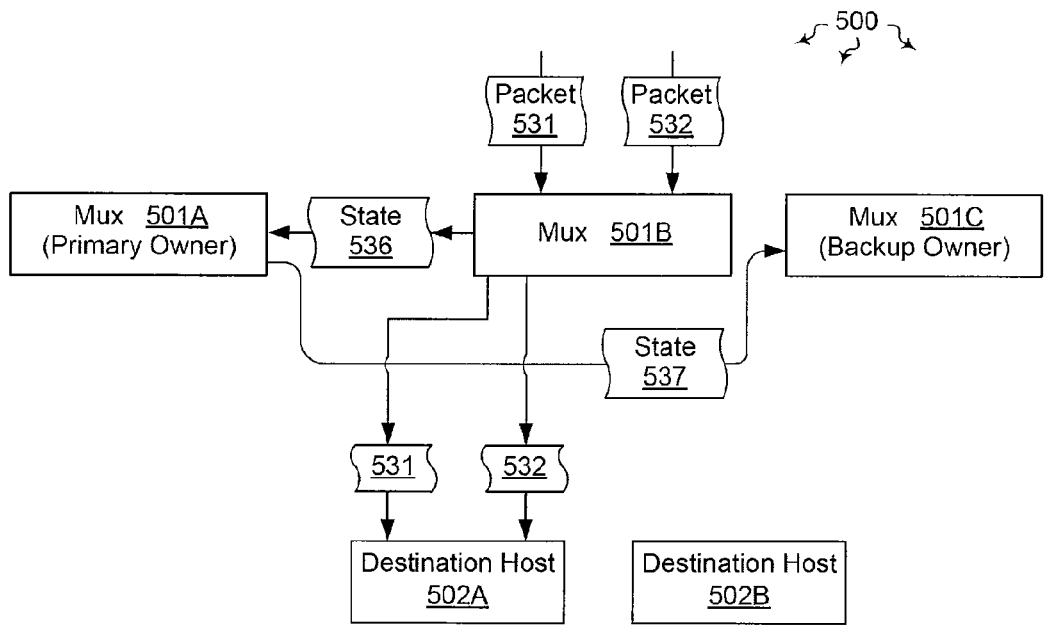

FIGS. 5A and 5B illustrate example computer architecture 500 for sharing state between muxes. As depicted, computer architecture 500 includes muxes 501A, 501B, and 501C and destination hosts 502A, 502B, and 502C.

In FIG. 5A, Mux 501A is the primary owner for an existing data flow including packets 521 and 522 (packets 521 and 522 are non-SYN packets). Mux 501C is a backup owner for the data flow including packets 521 and 522.

Mux 501A receives packet 521. Mux 501A determines that it is the owner of the existing data flow and that it lacks sufficient information to identify an appropriate destination host (i.e., mux 501A lacks cached state for the existing data flow). In response, mux 501A refers to the current destination array (e.g., new array 109) to identify the destination host 502A as the appropriate destination host. Mux 501A also begins to track state 526 for the existing data flow. Upon a subsequent transition and determination that state 526 is different from the new array, mux 501A sends state 526 to mux 501C. Mux 501C receives state 526 from mux 501A and caches state 526. State 526 maps the existing data flow to destination host 502A. Accordingly, if mux 501A fails, mux 501C can take over in providing state 526 to other muxes.

In FIG. 5B, Mux 501A is the primary owner for an existing data flow including packets 531 and 532 (packets 531 and 532 are non-SYN packets). Mux 501C is a backup owner for the data flow including packets 531 and 532.

Mux 501B receives packets 531 and 532. Mux 501B has sufficient information to determine that destination host 502A is the appropriate destination host for the existing data flow (i.e., it is either a new flow or the mux has cached information about the flow). Mux 501B also determines that mux 501A is the primary owner of the existing data flow. Upon a change in the destination array, mux 501B detects a transition and sends state 536 to mux 501A. Mux 501A receives state 536 from mux 501B. State 536 maps the existing data flow to destination host 502A.

If more packets belonging to the same flow keep arriving at Mux 501B, it keeps sending a batch update 538 (that includes state 536 and other states for which Mux 501A is the owner) to the owner mux 501A from time to time so that the owner mux always has the current information about all the flows it is the owner of.

From time to time, mux 501A can send batch state updates to other backup owners. For example, mux 501A can send state 537 to mux 501C. Mux 501C can receive state 537 from mux 501A. State 537 can be a batch of state updates (including state 536) for active flows being tracked by mux 501A.

Figure 6A:
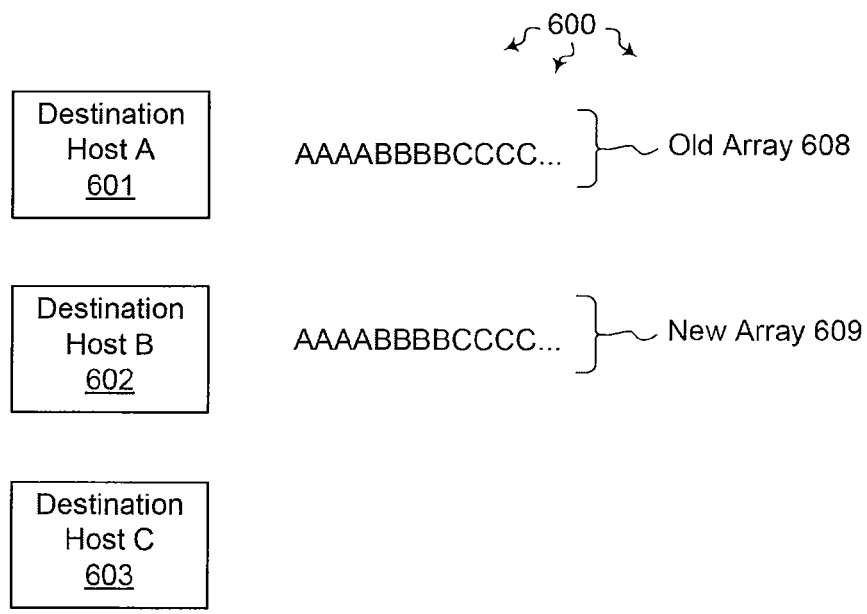
FIGS. 6A, 6B, 6C, and 6D illustrate an example computer architecture for maintaining data flow to destination host mappings.

FIGS. 6A, 6B, 6C, and 6D illustrate example computer architecture 600 for maintaining data flow to destination host mappings. FIG. 6A depicts an arrangement of destination host A 601, destination host B 602, and destination host C 603 in a steady state. Accordingly, old array 608 and new array 609 match one another. In a steady state, muxes can refer to an array to determine an appropriate destination host for a data flow.

Figure 6B:
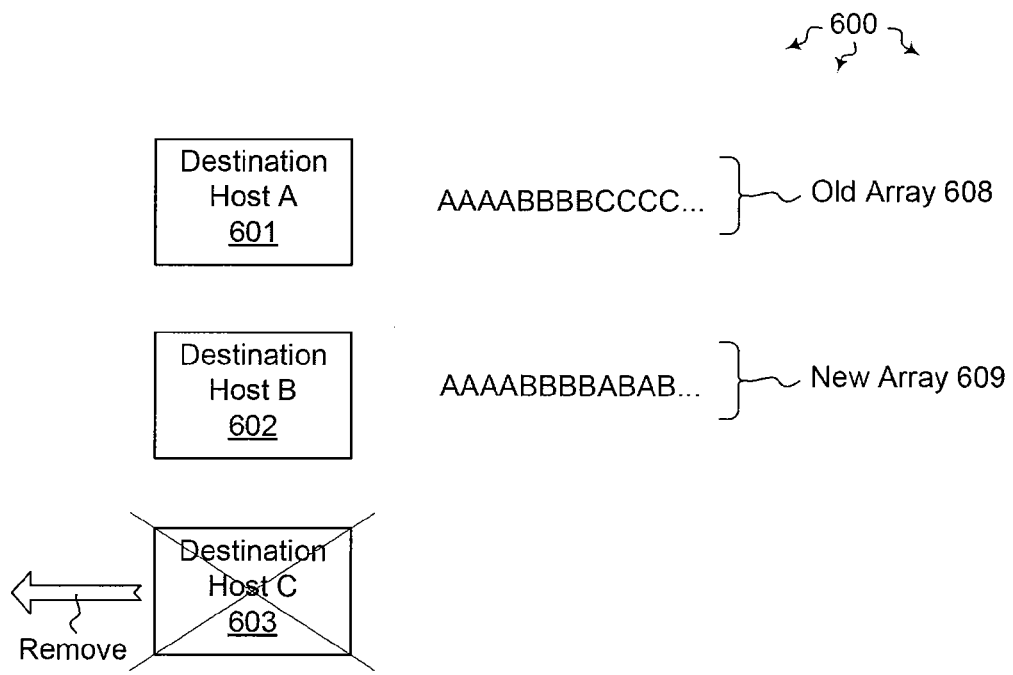

FIG. 6B depicts an arrangement of destination host A 601, destination host B 602, and destination host C 603, wherein destination host C 603 is removed. Removal of a destination host can be essentially instantaneous. As such, removal of a destination host does not necessary indicate a transition in the arrangement of destination hosts. Thus, upon removal of a destination host, muxes can still refer to an array to determine an appropriate destination host for a data flow.

Figure 6C:
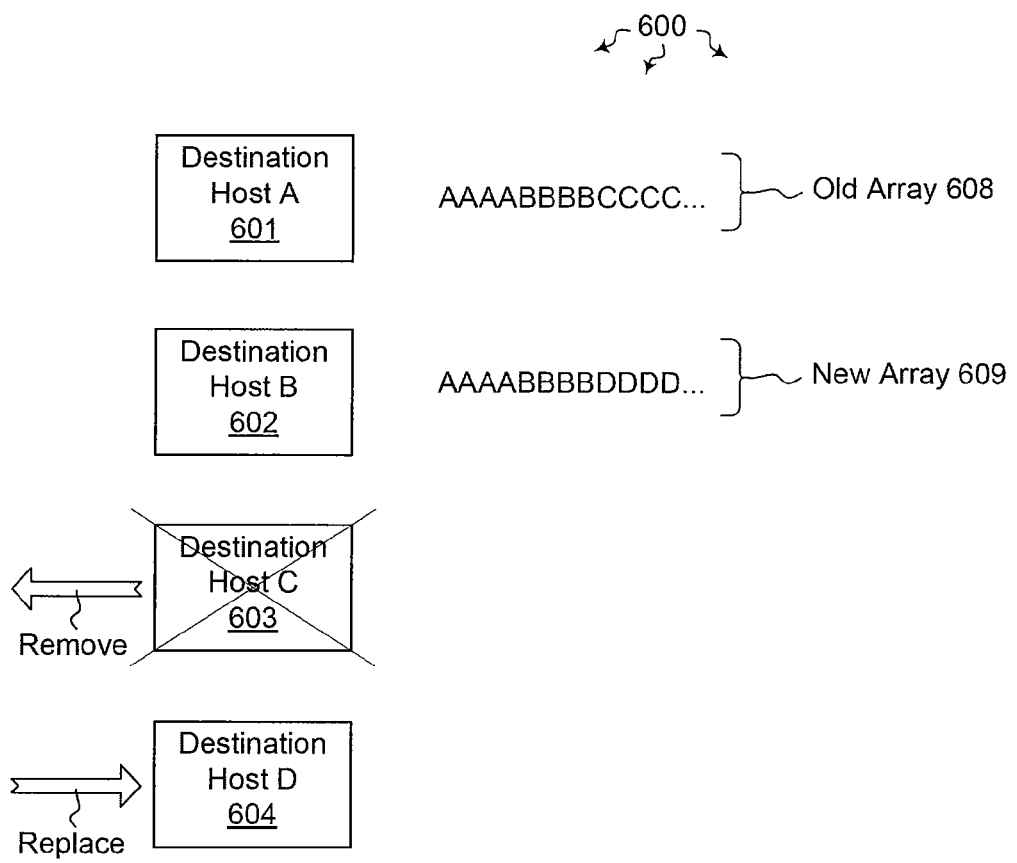

FIG. 6C depicts an arrangement of destination host A 601, destination host B 602, destination host C 603, and destination host D 604, wherein destination host C 603 is replaced with destination host D 604. Replacement of a destination host can also be essentially instantaneous. As such, replacement of a destination host does not necessary indicate a transition in the arrangement of destination hosts. Thus, upon replacement of a destination host, muxes can still refer to an array to determine an appropriate destination host for a data flow.

Figure 6D:
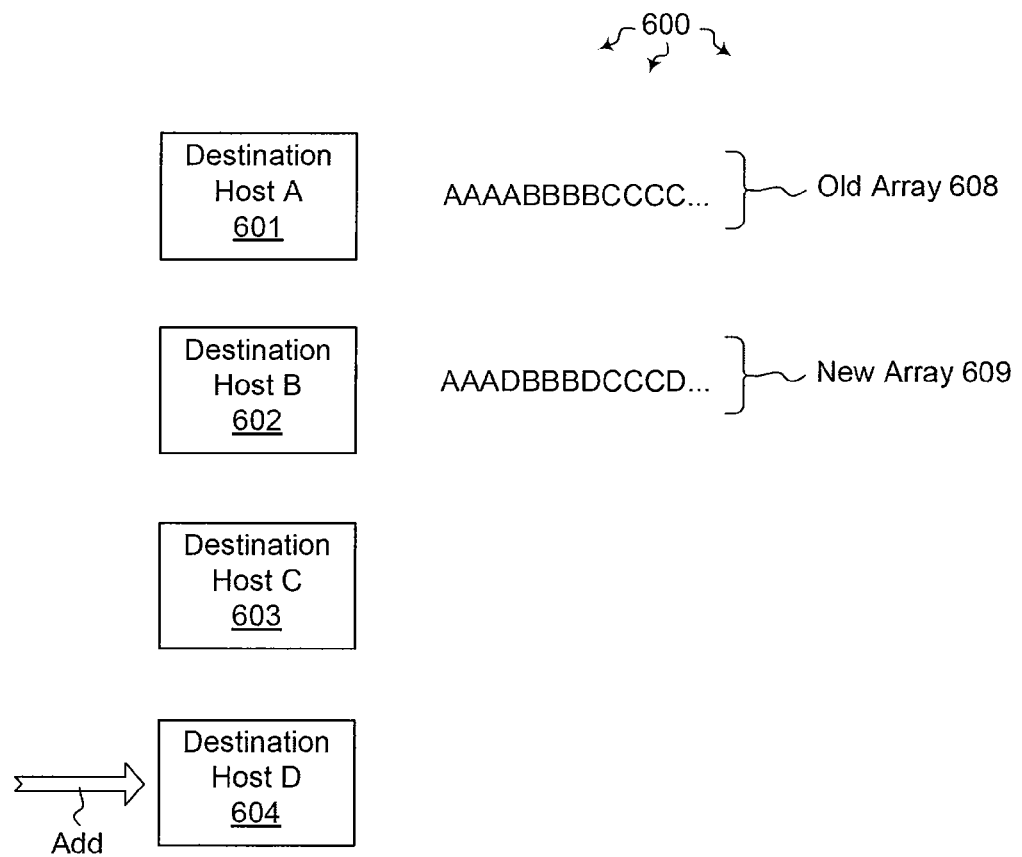

FIG. 6D depicts an arrangement of destination host A 601, destination host B 602, destination host C 603, and destination host D 604, wherein destination host D 603 is added. Addition of a destination host can include a transition period and thus a transition in the arrangement of destination hosts. During the transition period, mappings in old array 608 and new array 609 can differ (since some data flows are re-allocated to destination host D 604 to balance out workload). When different mappings are detected, muxes can track and exchange data flow state. When all the owner muxes have enough information to make decisions about the flows they own, the arrangement of destination hosts returns to a steady state and old array 608 and new array 609 match again.

Figure 7A:
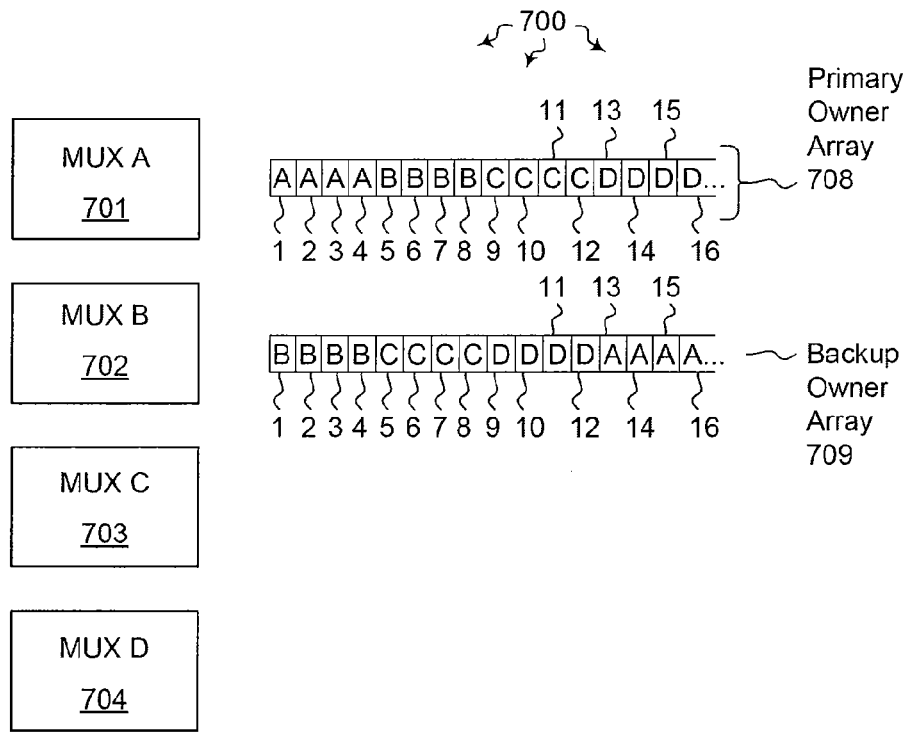
FIGS. 7A and 7B illustrate an example computer architecture for maintaining data flow to owner mux mappings.
Figure 7B:
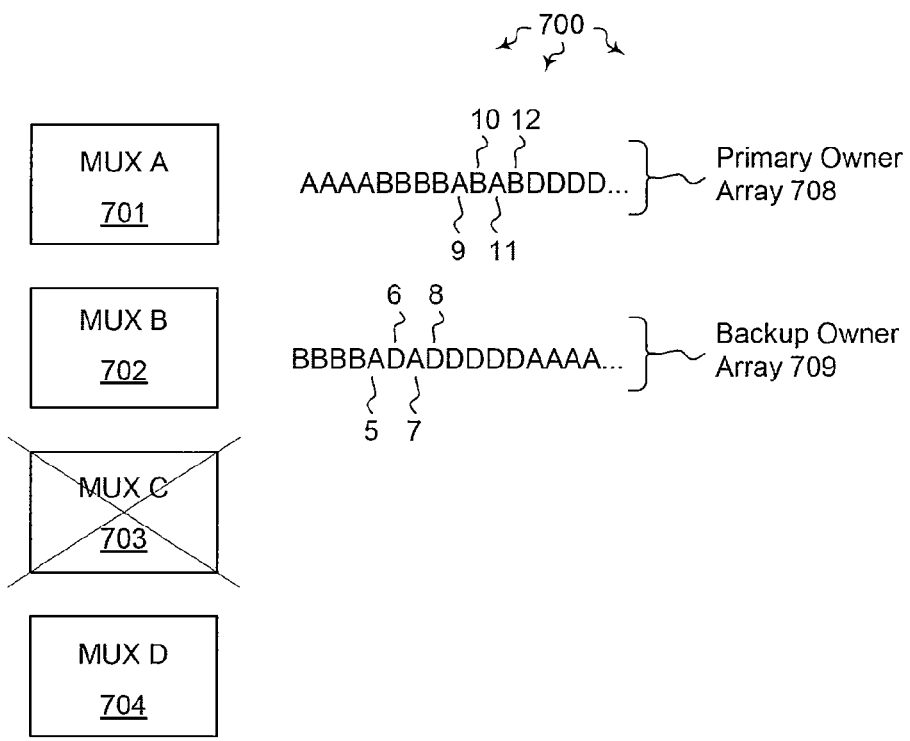

FIGS. 7A and 7B illustrate example computer architecture 700 for maintaining data flow to owner mux mappings. FIG. 7A depicts mux A 701, mux B 702, mux C 703, and mux D 704. Primary owner array 708 maps data flows to primary owner muxes. Backup owner array 709 maps data flows to backup owners muxes. The index position in an array can correspond to data flow ID. For example, the primary owner for data flow ID 6 is mux B 702. Similarly, a backup owner for data flow ID 6 is mux C 703. In some embodiments, an owner detector (e.g., 142A, 142B, 142C, etc.) uses a data flow ID as an index position into an array and sends state updates to the mux identified at the index position.

When a mux fails, primary and backup ownership responsibilities for the mux are re-allocated. FIG. 7B depicts a failure of mux C 703. In response to the failure, primary ownership for index positions (data flow IDs) 9-12 and backup ownership for index positions (data flow IDs) 5-8 are reallocated to remaining muxes.

Accordingly, embodiments of the invention include load balancers using a consistent hashing algorithm to decide how new connections should be load balanced. Use of consistent hashing algorithm permits load balancers to minimize the amount of state that needs to be exchanged. In particular, only flow states that cannot be determined using the hash and destination array need to be synchronized. Load balancers keep flow state information (destination address for a given flow) about incoming packets. When it is needed, i.e. such as, for example, when a change in destination host configuration is detected, selected state information is shared across load balancers in a deterministic way, which enables the authoritative (e.g., is the owner) load balancer to choose the correct destination host for a given flow. Each load balancer can reach the authoritative load balancer to learn about a flow that cannot be determined locally.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a computer system including a router and a load balancing system, the load balancing system including a load balancer, one or more other load balancers, and a plurality of destination hosts, the router connected to a network and being a point of ingress into the load balancing system, components on the network using a virtual electronic address to communicate with the load balancing system, a method for sharing state between load balancers, the method comprising:

an act of the load balancer receiving a packet from the router, the packet containing source electronic address information identifying a source on the wide area network and destination electronic address information including the virtual electronic address;

an act of the load balancer determining that the packet is for an existing data flow;

an act of the load balancer using an algorithm to generate a data flow identifier for the existing data flow from the packet contents, including the packet headers;

an act of load balancer determining that the load balancer lacks sufficient information to identify the destination host, from among the plurality of destination hosts, that corresponds to the existing data flow, including:

an act of the load balancer determining that the load balancer does not have any cached state mapping the existing data flow to one of the destination hosts in the plurality of destination hosts;

in response to the determination that the load balancer lacks sufficient information to identify the destination host that corresponds to the existing data flow:

an act of the load balancer identifying an owner load balancer that is designated as the owner of the existing data flow, the owner load balancer selected from among the one or more other load balancers; and an act of the load balancer sending a request for data flow state information to the owner load balancer, wherein the act of the load balancer sending the request for data flow state information to the owner load balancer comprises an act of the load balancer sending the packet to the owner load balancer;

an act of the load balancer receiving state information from the owner load balancer, the state information identifying the destination host that corresponds to the existing data flow; and an act of the load balancer caching the received state information.

2. The method as recited in claim 1, further comprising in response to the determination that the arrangement of the plurality of destination hosts is in a transition:

an act of the load balancer identifying cached state for one or more other existing data flows, the cached state mapping the one or more other existing data flows to corresponding destination hosts in the plurality of destination hosts;

an act of the load balancer using the current destination host array to identify data flows for which the destination host is different from the current mapping;

for each of these one or more existing more data flows:

an act of the load balancer identifying an owner load balancer, selected from among the one or more other load balancers, that is designated as the owner of the existing data flow; and an act of sending cached state for the existing data flow to the owner load balancer for the existing data flow.

3. The method as recited in claim 1, further comprising an act of the load balancer receiving cached state for one or more other existing data flows from the one or more other load balancers, the one or more other load balancers having determined the load balancer to be an owner load balancer for the one or more other existing data flows.

4. The method as recited in claim 3, wherein the act of the load balancer receiving cached state for one or more other existing data flows from the one or more other load balancers comprises an act of receiving cached state for at least one existing data flow from another load balancer that the load balancer determined to be the primary owner load balancer for the at least one existing data flow.

5. The method as recited in claim 4, further comprising the load balancer sending the cached state for the at least one existing data flow to at least one other load balancer, the at least one other load balancer designated as a backup owner load balancer for the existing data flow.

6. The method as recited in claim 1, wherein the act of the load balancer receiving a packet from the router comprises an act of the load balancer receiving a packet in accordance with one of: an Equal Cost Multi-Path (ECMP) algorithm or a Domain Name System (DNS) round robin algorithm.

7. The method as recited in claim 1, further comprising:

an act of the load balancer receiving a second packet for the existing data flow; and an act of the load balancer referring to cached state information to identify the destination host as corresponding to the existing data flow; and an act of the load balancer sending the second packet to the destination host.

8. The method as recited in claim 1, wherein the act of the load balancer using an algorithm to generate a data flow identifier for the existing data flow comprise an act of using a hash algorithm to hash a source Internet Protocol address for the source and virtual Internet Protocol address, the data flow identifier representing an index into a current mapping array that maps data flows to corresponding destination hosts.

9. The method as recited in claim 8, wherein the act of the load balancer detecting that the arrangement of the plurality of destination hosts is in a transition comprises an act of determining that the contents of the current mapping array different from the contents of a prior version of the mapping array.

10. The method as recited in claim 8, wherein the act of the load balancer identifying an owner load balancer that is designated as the owner of the existing data flow comprises:

an act of using a second hashing algorithm to hash the source Internet Protocol address and the virtual Internet Protocol address into a second hash value, the second hash value representing a position in a primary owner partition array, the primary owner partition array mapping data flows to corresponding load balancers that maintain cached state for the data flows; and an act of referring to the position in the primary owner partition array to identify the load balancer that that is mapped as the owner of the existing data flow.

11. The method as recited in claim 1, further comprising an act of the load balancer sending the packet to the destination host that corresponds to the data flow in accordance with the received state information.

12. At a computer system including a router and a load balancing system, the load balancing system including a load balancer, one or more other load balancers, and a plurality of destination hosts, the router connected to a network and being a point of ingress from the wide area network into the load balancing system, components on the network using a virtual electronic address to communicate with the load balancing system, a method for sharing state between load balancers, the method comprising:

an act of a first load balancer receiving a packet directly from a second load balancer, the packet containing source electronic address information identifying a source on the network and destination electronic address information including the virtual electronic address and which is sufficient to identify a data flow associated with the packet, wherein the packet was sent to the first load balancer in response to a determination being made that the second load balancer lacks sufficient information to identify a destination host corresponding to the dataflow, and wherein the packet was routed to the second load balancer by the router;

an act of the first load balancer determining that the received packet is for an existing data flow;

an act of the first load balancer determining that the first load balancer is the owner of the existing data flow;

an act of the first load balancer determining that the first load balancer has cached state for the existing data flow, the cached state mapping the existing data flow to one of the destination hosts in the plurality of destination hosts;

an act of the first load balancer sending the received packet to the destination host mapped to the existing data flow; and an act of first load balancer sending the cached state to the second load balancer for use in appropriately forwarding subsequent packets in the existing data flow to the one of the destination hosts.

13. The method as recited in claim 12, further comprising an act of the first load balancer receiving cached state for one or more other existing data flows from the one or more other load balancers, the one or more other load balancers having determined the first load balancer to be the primary owner load balancer for the one or more other existing data flows.

14. The method as recited in claim 12, further comprising an act of the first load balancer receiving a batch of cached state for another existing data flow from another load balancer, the other load balancer being the primary owner load balancer for the other existing data flow, the other load balancer having determined that the first load balancer is a backup owner load balancer for the other existing data flow.

15. The method as recited in claim 12, further comprising an act of the first load balancer sending a batch of cached state for the existing data flow to at least one other owner load balancer for caching at the at least one other load balancer, the first load balancer determining that the at least one other load balancers are designated as a backup owner load balancers for the existing data flow.

16. The method as recited in claim 12, further comprising an act of the first load balancer sending state for another existing data flow to another load balancer, the first load balancer having determined that the data flow state is different in the current destination array; and an act of the first load balancer determining that the other load balancer is the primary owner of the other existing data flow.

17. A computer system including a router and a load balancing system, the load balancing system including a load balancer, one or more other load balancers, and a plurality of destination hosts, the router connected to a network and being a point of ingress into the load balancing system, components on the network using a virtual electronic address to communicate with the load balancing system, the computing system further comprising one or more storage media having stored computer-executable instructions which, when executed by the at least one processor, implement a method for sharing state between load balancers, the method comprising:

an act of the load balancer receiving a packet from the router, the packet containing source electronic address information identifying a source on the wide area network and destination electronic address information including the virtual electronic address;

an act of the load balancer determining that the packet is for an existing data flow;

an act of the load balancer using an algorithm to generate a data flow identifier for the existing data flow from the packet contents, including the packet headers;

an act of load balancer determining that the load balancer lacks sufficient information to identify the destination host, from among the plurality of destination hosts, that corresponds to the existing data flow, including:

an act of the load balancer determining that the load balancer does not have any cached state mapping the existing data flow to one of the destination hosts in the plurality of destination hosts;

in response to the determination that the load balancer lacks sufficient information to identify the destination host that corresponds to the existing data flow:

an act of the load balancer identifying an owner load balancer that is designated as the owner of the existing data flow, the owner load balancer selected from among the one or more other load balancers; and an act of the load balancer sending a request for data flow state information to the owner load balancer, wherein the act of the load balancer sending the request for data flow state information to the owner load balancer comprises an act of the load balancer sending the packet to the owner load balancer;

an act of the load balancer receiving state information from the owner load balancer, the state information identifying the destination host that corresponds to the existing data flow; and an act of the load balancer caching the received state information.

18. The system as recited in claim 17, wherein the method further comprises, in response to the determination that the arrangement of the plurality of destination hosts is in a transition:

an act of the load balancer identifying cached state for one or more other existing data flows, the cached state mapping the one or more other existing data flows to corresponding destination hosts in the plurality of destination hosts;

an act of the load balancer using the current destination host array to identify data flows for which the destination host is different from the current mapping;

for each of these one or more existing more data flows:

an act of the load balancer identifying an owner load balancer, selected from among the one or more other load balancers, that is designated as the owner of the existing data flow; and an act of sending cached state for the existing data flow to the owner load balancer for the existing data flow.

* * * * *